(12) United States Patent
Whitcher

(10) Patent No.: US 6,760,065 B1
(45) Date of Patent: Jul. 6, 2004

(54) IMAGING TABLE OF CONTENTS

(75) Inventor: Timothy J. Whitcher, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/534,390

(22) Filed: Mar. 24, 2000

(51) Int. Cl.[7] .............................................. H04N 5/76
(52) U.S. Cl. ........................... 348/231.2; 348/231.7; 348/333.01
(58) Field of Search .................. 348/207.99, 207.1, 348/231.99, 231.2, 231.3, 231.5, 231.6, 231.7, 231.9, 333.01, 333.02, 333.12, 220.1, 222.1; 707/200.2, 101, 102

(56) References Cited

U.S. PATENT DOCUMENTS

| | | | |
|---|---|---|---|
| 5,434,974 A | 7/1995 | Loucks et al. | |
| 5,513,351 A | 4/1996 | Grantz | |
| 5,528,293 A | 6/1996 | Watanabe | |
| 5,579,517 A | 11/1996 | Reynolds et al. | |
| 5,678,045 A | 10/1997 | Bettels | |
| 5,758,352 A | 5/1998 | Reynolds et al. | |
| 5,806,072 A * | 9/1998 | Kuba et al. .................. | 707/200 |
| 5,861,918 A | 1/1999 | Anderson et al. | |
| 5,926,805 A | 7/1999 | Hurvig et al. | |
| 5,943,093 A | 8/1999 | Anderson et al. | |
| 5,986,701 A | 11/1999 | Anderson et al. | |
| 6,052,692 A * | 4/2000 | Anderson et al. ............ | 707/102 |
| 2002/0054218 A1 * | 5/2002 | Kobayashi et al. ......... | 348/220 |
| 2003/0174217 A1 * | 9/2003 | Kito et al. ................ | 348/231.2 |

* cited by examiner

Primary Examiner—Tuan Ho
(74) Attorney, Agent, or Firm—Stephen H. Shaw

(57) ABSTRACT

A computer system has a processor running an operating system that supports one or more filesystems and removable storage device capable of storing images captured by a digital camera and formatted by the operating system according to a supported filesystem. According to one aspect of the present invention, a method comprises the computer-implemented steps of (a) storing in the removable storage device a first directory entry for a filesystem wherein the first directory entry includes a file name having a restrictive pathname imposed by the naming convention of the supported filesystem; (b) storing in the removable storage device an image table of contents for the stored images wherein the image table of contents includes a presentation filename having a presentation pathname selected by a user of the digital camera, the presentation pathname being independent of the naming convention of the supported filesystem; and (c) storing in the image table of contents a linkage between the image table of contents and the first directory such that the presentation pathname may be mapped into the restrictive pathname whenever the first directory is accessed for presentation by a user interface of a receiving system.

23 Claims, 6 Drawing Sheets

IMAGING TABLE OF CONTENTS

FIELD OF THE INVENTION

The invention relates generally to the field of digital photography, and in particular to filesystems for removable memory used in digital cameras.

BACKGROUND OF THE INVENTION

A computer filesystem can generally be thought of as an organized collection of entries, which include either file or directory entries. When an entry is created, it is usually given a name in a specific namespace that is unique among the names of other entries in the same directory. Each name in its namespace has its own syntax requirements for a particular filesystem. Computer systems may display the filesystem contents of resident computer file storage, e.g., a disk drive, many different ways. For example, a DOS disk will display filenames with a maximum of eight characters and a three-character extension. This is known as 8.3. A UNIX system does not have this file naming convention. Longer filenames are possible. In the world of digital photography DOS like restrictions are ubiquitous. There is a JEIDA Standard related to digital cameras, Design rule for Camera Filesystem (DCF), that has DOS-like filename restrictions and even more restrictive filename assignment and directory naming rules.

Removable storage media comes in many forms: CD, floppy disk, compact flash cards, etc. These removable media can also be formatted in many different variations. Variation can occur with respect to filesystem and variation can even occur in block size when the physical recording format permits it. Additionally, constraints on the namespace or the directory hierarchy can lead to variations. The JEIDA standard Design rulefor Camera Filesystem (DCF) is one constraint set which imposes a naming convention on filenames and directory names on media, including removable media, that is formatted with a FAT filesystem. These restrictive naming conventions have serious drawbacks in the experience they present to the user, particularly for a user uninitiated to computer jargon, and particularly when each file should correspond to a meaningful expression of the user, such as a name for an image captured by a digital camera.

This problem can be seen in U.S. Pat. No. 5,861,918, "Method and System for Managing a Removable Memory in a Digital Camera", which describes a method to create unique folders on storage media that are associated with a specific digital camera by an identifier prefix. The camera will then only store images in that folder. That way when multiple cameras use the same removable storage media, each camera has its own folder. However, in the procedure described by this patent the folder created by the digital camera for its exclusive use must still have a name (folder name) that is within the constraints of the filesystem that is utilized on the removable storage. Consequently when the folders are displayed as shown in FIG. 7B of the patent, their name is constrained by the filesystem and retains a form that is essentially unintelligible to a user (such as "IM000324", "IM000339", etc.).

There have been attempts to rectify these problems. U.S. Pat. No. 5,579,517 describes how an additional file name can be associated with a common file. More specifically, a directory record (directory entry) in the filesystem is created for the file using a short name (8.3 for instance). Then another directory record in the same filesystem is created for the long file name for the same file. However, because both the short file name directory record and the long file name directory record are components of the same filesystem, they share the same namespace (permitted character set), and thus have the same character set restrictions.

It would be desirable for the user interface on any receiving system of removable media containing images to be able to present a consistent experience to a user for all filesystems and naming conventions. In particular it would be desirable to enable removable storage media to use any naming convention in the recording process and at the same time describe how its contents should be presented in a system that adheres to different naming conventions.

SUMMARY OF THE INVENTION

The present invention is directed to overcoming one or more of the problems set forth above. Briefly summarized, a computer system has a processor running an operating system that supports one or more filesystems and one or more removable storage devices capable of storing therein images captured by a digital camera and formatted by the operating system according to a supported filesystem. According to one aspect of the present invention, a method comprises the computer-implemented steps of (a) storing in the removable storage device a first directory entry for a filesystem wherein the first directory entry includes a file name having a restrictive pathname imposed by the naming convention of the supported filesystem; (b) storing in the removable storage device an image table of contents for the stored images wherein the image table of contents includes a presentation filename having a presentation pathname selected by a user of the digital camera, the presentation pathname being independent of the naming convention of the supported filesystem; and (c) storing in the image table of contents a linkage between the image table of contents and the first directory such that the presentation pathname may be mapped into the restrictive pathname whenever the first directory is accessed for presentation by a user interface of a receiving system.

The advantage of the invention is that inclusion of a standardized Image Table of Contents file on removable storage will enable the presentation of a consistent user interface on a receiving system even when the removable storage media has been recorded with varying filesystems and naming conventions.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because processing systems employing file storage, particularly digital camera processing systems employing removable file storage, are well known, the present description will be directed in particular to attributes forming part of, or cooperating more directly with, system, apparatus and method in accordance with the present invention. Attributes and elements not specifically shown or described herein may be selected from those known in the art. In the following description, a preferred embodiment of the present invention would ordinarily be implemented by an operating system via a software program. Given the filesystem and related methodology as shown and described according to the invention in the following materials, software not specifically shown, described or suggested herein that is useful for implementation of the invention is conventional and within the ordinary skill in such arts.

Figure 5:
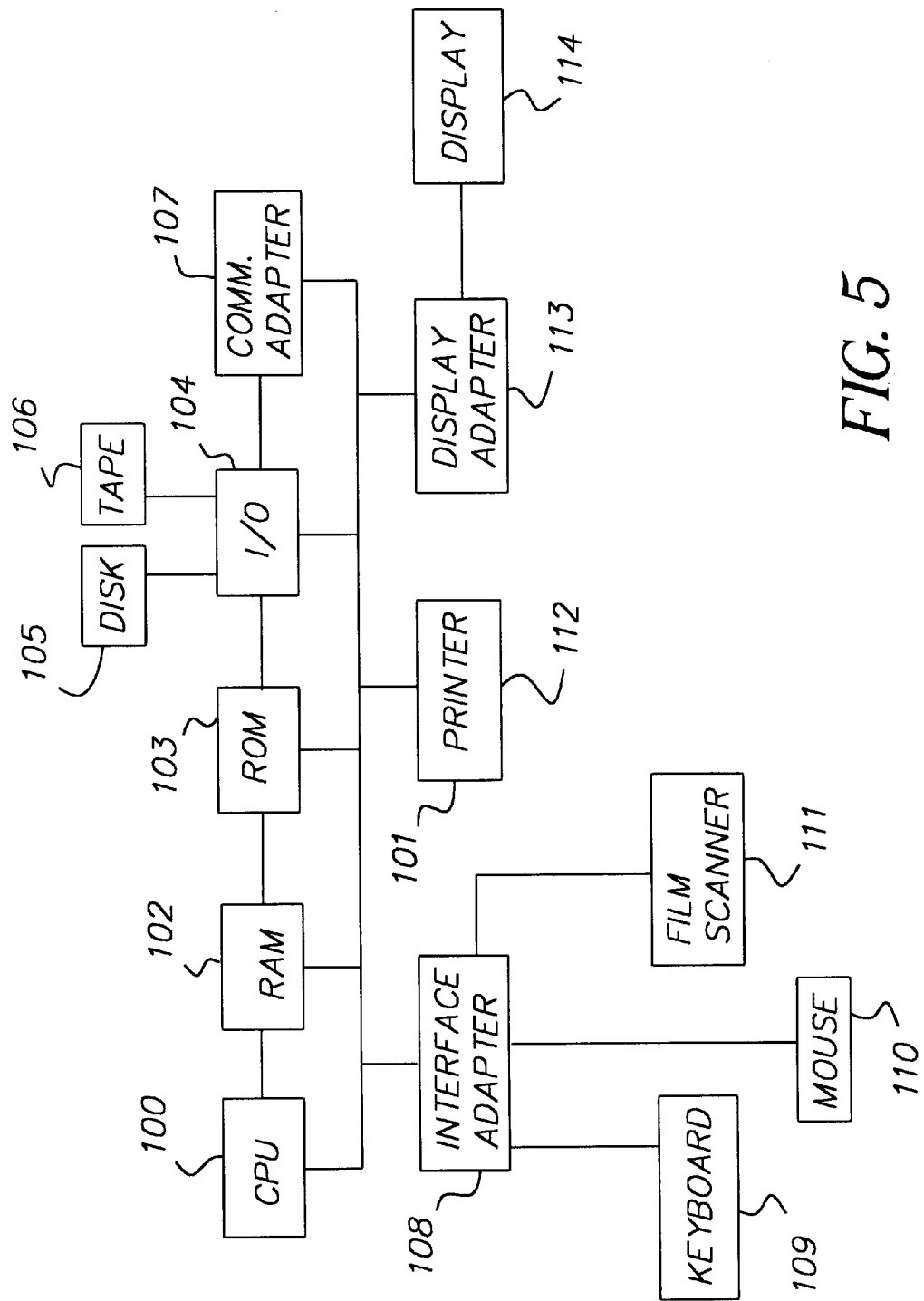
FIG. 5 is a block diagram of a computer system in which the present invention may be used.

While the overall methodology of the invention will be described in detail below, it is helpful to understand that the invention can be embodied in any number of different types of systems and executed in any number of different ways, as would be known by one ordinarily skilled in the art. For example, as illustrated in FIG. 5, a typical hardware configuration of an information handling/computer system using a filesystem in accordance with the invention preferably has at least one processor or central processing unit (CPU) 100. The CPU 100 is interconnected via a system bus 101 to a random access memory (RAM) 102, a read-only memory (ROM) 103, an input/output (I/O) adapter 104 (for connecting peripheral devices such as disk units 105 and tape drives 106 to the bus 101), a communication adapter 107 (for connecting an information handling system to a data processing network), a user interface adapter 108 (for connecting peripherals 109, 110, 111 such as a keyboard, mouse, digital image scanner unit and/or other user interface device to the bus 101), a printer 112 and a display adapter 113 (for connecting the bus 101 to a display device 114). The software embodying the invention may be stored in conventional computer readable storage medium, which may comprise, for example; magnetic storage media such as the magnetic disk 105 (e.g., a hard drive or a floppy disk) or the magnetic tape 106; optical storage media such as an optical disc, optical tape, or machine readable bar code; solid state electronic storage devices such as the random access memory (RAM) 102, or the read only memory (ROM) 103; or any other physical device or medium employed to store a computer program.

Figure 6:
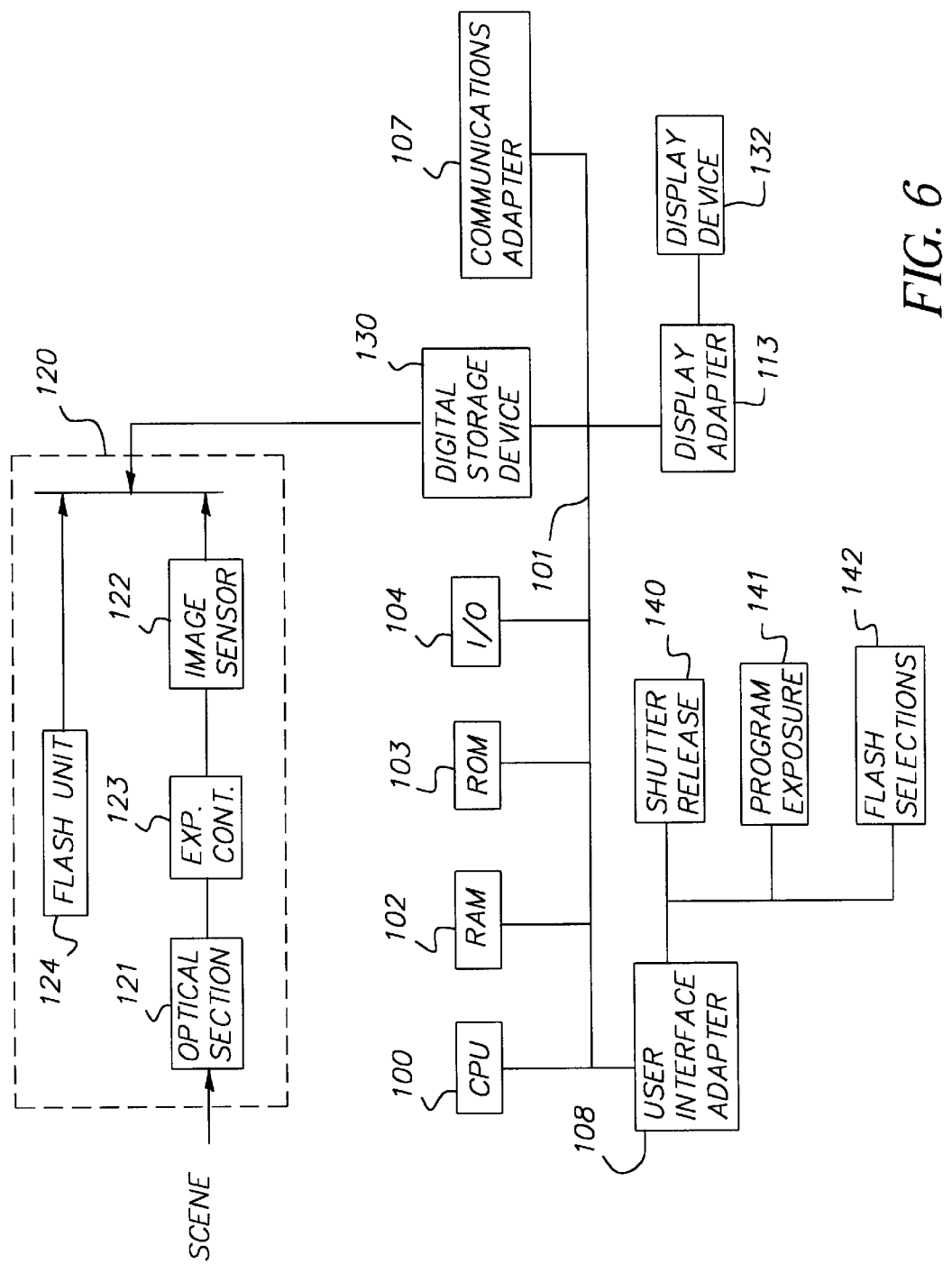
FIG. 6 is a block diagram of a digital camera system in which the present invention may be used.

The invention may also be embodied in a digital camera. For example, as illustrated in FIG. 6, a camera is shown as an integrated system embodying certain components of the information handling/computer system shown in FIG. 5. In addition, the camera includes an image capture section 120, a removable storage device 130 for storing captured images and associated annotations related to the images (such as image names), and a display device 132 for displaying captured images and/or other data useful in operation of the camera. The capture section 120 includes an optical section 121 having autofocus capability for focusing a scene image upon an image sensor 122, such as a conventional charge-coupled device (CCD). An exposure control mechanism 123 includes an aperture and shutter for regulating the exposure of the image upon the image sensor 122. A flash unit 124 is also provided for illuminating the scene image when ambient light is insufficient.

Similarly to FIG. 5, the CPU 100 is interconnected via the system bus 101 to the random access memory (RAM) 102, the read-only memory (ROM) 103, the input/output (I/O) adapter 104 (for connecting the capture section 120, the digital storage device 130 and the flash 124 to the bus 101), the communication adapter 107 (for connecting directly to an information handling system or a data processing network, such as the Internet), the user interface adapter 108 (for connecting user interface devices such as a shutter button 140, flash controls 141, programmed exposure selections 142 and/or other user interface devices to the bus 101) and a display adapter 113 (for connecting the bus 101 to the display device 132). The image display device 132 enables a photographer to preview an image before capture and/or to view the last image captured. In addition, an optical viewfinder (not shown) is often provided for previewing an image.

Figure 1:
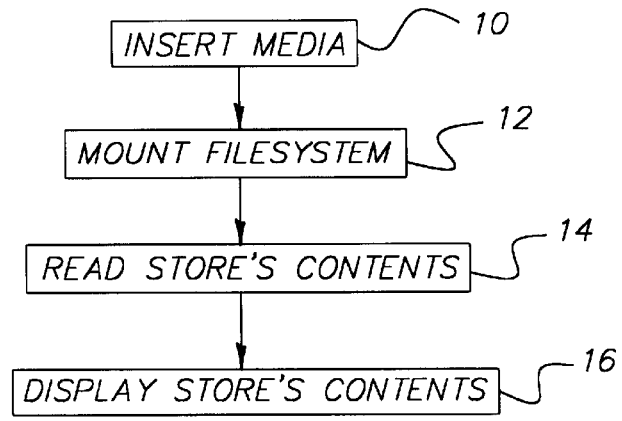
FIG. 1 is a chart describing the sequence of events that conventionally occur when removable storage is inserted into a device such as a computer or digital camera.

The flowchart in FIG. 1 describes the sequence of events that conventionally occur when removable storage is inserted into a device such as the computer or digital camera shown in FIGS. 5 and 6, respectively. Initially, in step 10, media is inserted into a suitable interface device in the computer or digital camera. The next step 12 is to determine and mount the filesystem. The computer or digital camera may support only one filesystem, which simplifies this procedure. However, several computer (PC) platforms have the capability to install multiple filesystems. While at present most digital cameras do not have this capability, as the sophistication of the digital camera increases this capability is technically possible. When a platform has multiple filesystems installed, it becomes a systematic process to determine what filesystem is recorded on a given unit of removable storage media. Once the filesystem is mounted, the CPU 100 reads the contents of the storage device 130 in a reading step 14 and displays the contents on the display 114 (or 132) in a display step 16.

Each filesystem has specific on-disk structures (or more appropriately block-address-space structures) that the filesystem implementation on the receiving system uses to mount the media. These on-disk structures are more commonly known as anchor points, volume descriptors, and allocation tables. In fact ISO SC15 has standardized these structures for the ISO defined volume and file formats. The on-disk structures are at known addresses that enable the receiving system to discriminate one format from another.

Figure 2:
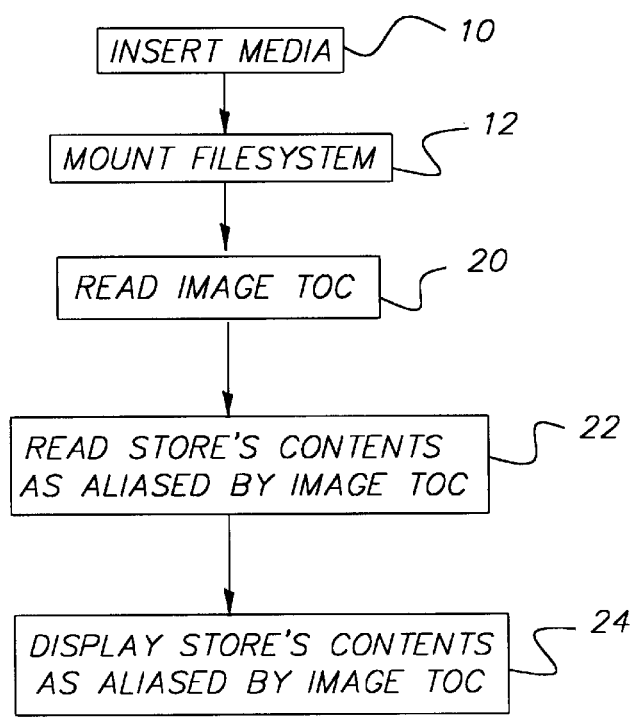
FIG. 2 is a chart describing the sequence of events that occur when removable storage having a special descriptor file called the Image Table of Contents is inserted into a device such as a computer or digital camera.

To enable a common user interface presentation from a given unit of removable storage that has one of many filesystem on-disk structures recorded on it and one of many naming conventions, one needs to have a descriptor file with a standardized name. In accordance with the invention, the flowchart in FIG. 2 describes the sequence of events that occur when removable storage that has a special descriptor file called the Image Table of Contents is inserted into a device such as the computer or digital camera shown in FIGS. 5 and 6, respectively. This document shall refer to this descriptor file as the Image Table of Contents, or more simply Image TOC. One of the things to be standardized is the filename of the Image TOC. Initially, as shown in step 10 in FIG. 1, removable media 130 is inserted into a suitable interface device in the computer or digital camera. The next step 12 is to determine and mount the filesystem.

Figure 3:
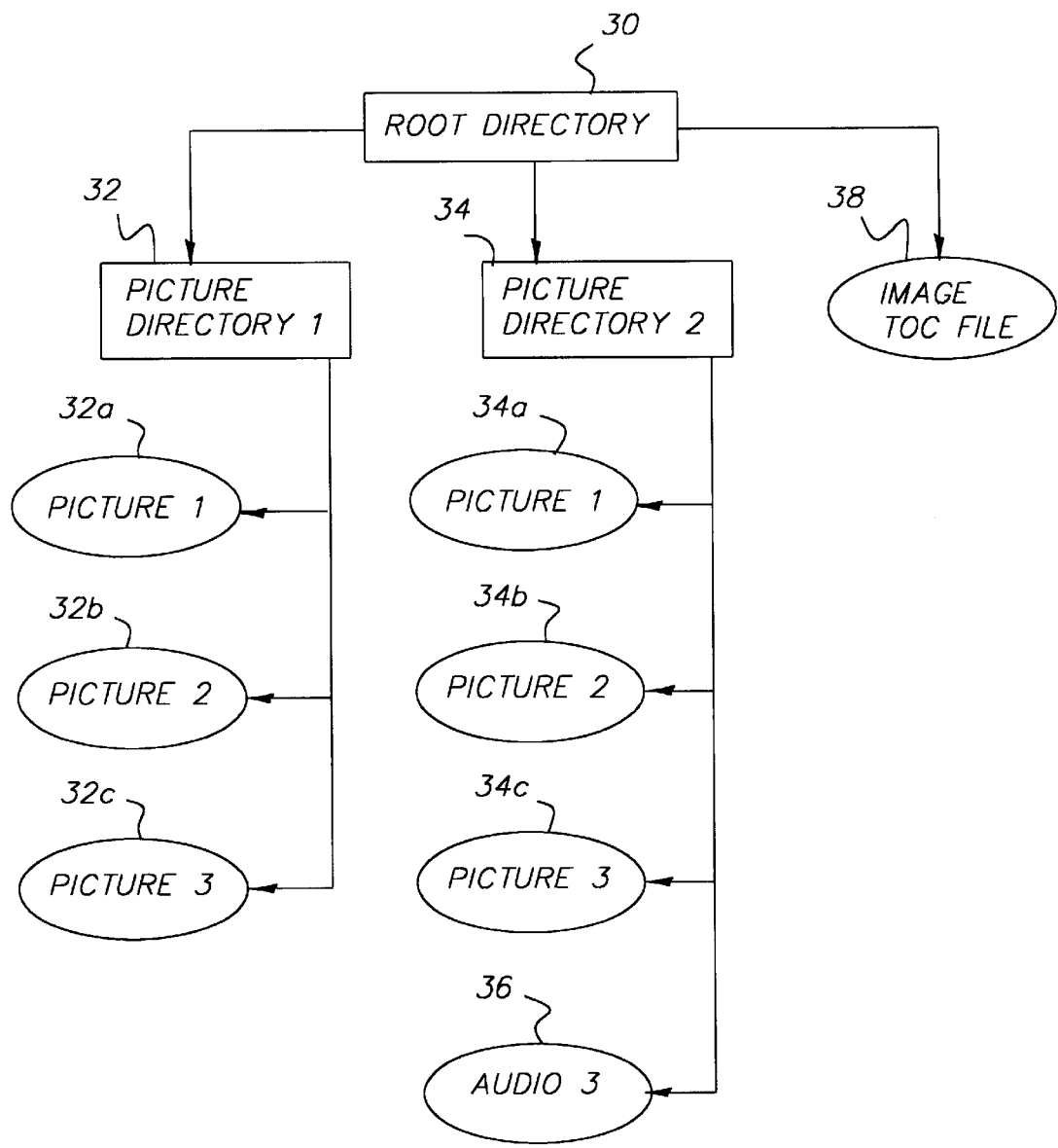
FIG. 3 is an example of a filesystem directory hierarchy including the Image Table of Contents described in FIG. 2.
Figure 4:
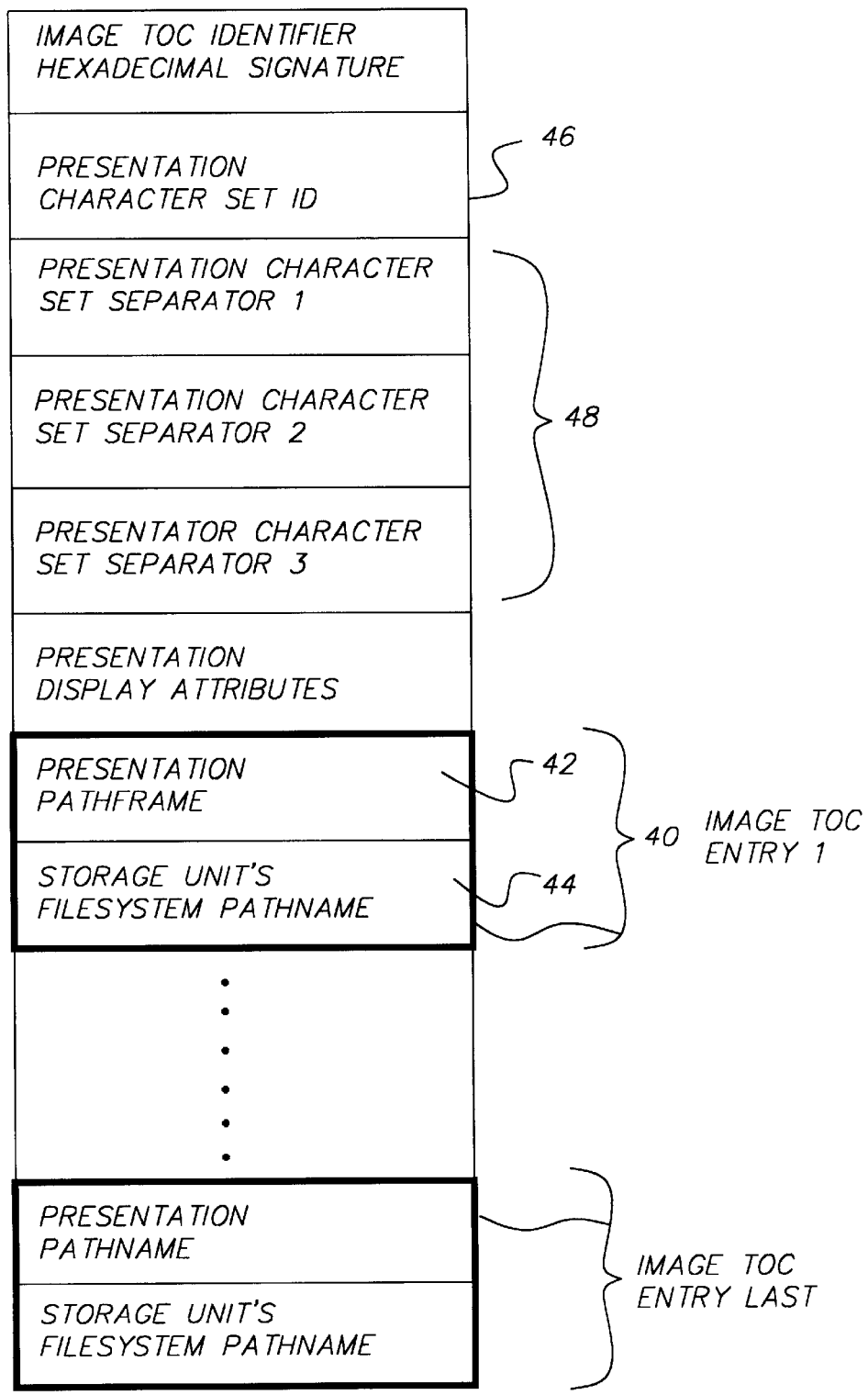
FIG. 4 is an example format of an Image Table of Contents file.

As shown in exemplary form in FIG. 3, a root directory 30 of the filesystem includes one or more picture directories, e.g., directories 32 and 34, each with restrictive pathnames imposed by the naming convention of the supported filesystem. Each picture directory includes a plurality of pictures, e.g., pictures 32a, 32b, 32c and 34a, 34b, 34c. Other types of records may be included in each directory, such as an audio record 36 related to the picture 34c. In addition, the root directory 30 contains the Image TOC file 38. As is shown in FIG. 4, an example format of the Image TOC includes an Image TOC entry 40 for establishing a linkage between the Image TOC file 38 and, e.g., the first picture directory 32 such that the presentation pathname 42 for each picture 32a, b, c . . . may be mapped (aliased) into the restrictive pathname 44 whenever the first directory is accessed for presentation by a user interface. There will be repeated Image TOC entries in the Image TOC file 38 to provide for the total number of pictures requiring a presentation pathname. In such a manner, the Image TOC provides a record structure that associates the presentation pathname and the restrictive pathname.

Once the filesystem is mounted, and when the Image TOC is present and when the CPU 100 of the receiving system can process it, the Image TOC contents of the removable storage unit 130 are read in a step 20 and the image contents on the storage device 130 are read in a step 22 as aliased by the Image TOC. Finally, the contents of the storage device 130 are displayed in a step 24 via the display interface 113 on the display 114 (or 132) of the receiving system, and look as if they were recorded using the aliased filesystem described by the Image TOC.

In fact, a given unit of removable media may have multiple filesystem structures recorded on it each with its own name space and its own naming conventions. What is important is that the Image TOC descriptor file has a standardized name for each namespace of each filesystem. If the character set of the name space for this descriptor file is restricted to ISO646 and an eight character filename is used, then the descriptor file can have a common name for all filesystems.

The internal format or structure of the Image TOC also needs to be standardized so that the receiving system can parse its contents. A few remarks are in order at this point before the format of this file is discussed in greater detail.

The proposed Photographic & Imaging Manufacturers Association (PIMA) 15740 Picture Transfer Protocol (PTP) places several functional requirements on a Digital Camera device. In addition to generating object handles for the transferable objects in the camera, the device also generates an ObjectInfo Dataset for each object it captures and retains this dataset in its internal memory. Now when a removable storage unit is inserted into the camera that is populated with images, the device must generate the ObjectInfo Dataset for each image on the inserted storage unit. This could be done all at once upon mounting of the removable storage or only when needed by a PTP transaction. As storage densities increase several datasets will need to be generated and stored in the device's internal memory. It would be much more efficient if these datasets were also stored on the media that also contained the objects. This would also free up some internal memory of the device. Consequently, PIMA 15740 ObjectInfo data could potentially be stored in the Image TOC in fields additional to those shown in FIG. 4.

Figure 7:
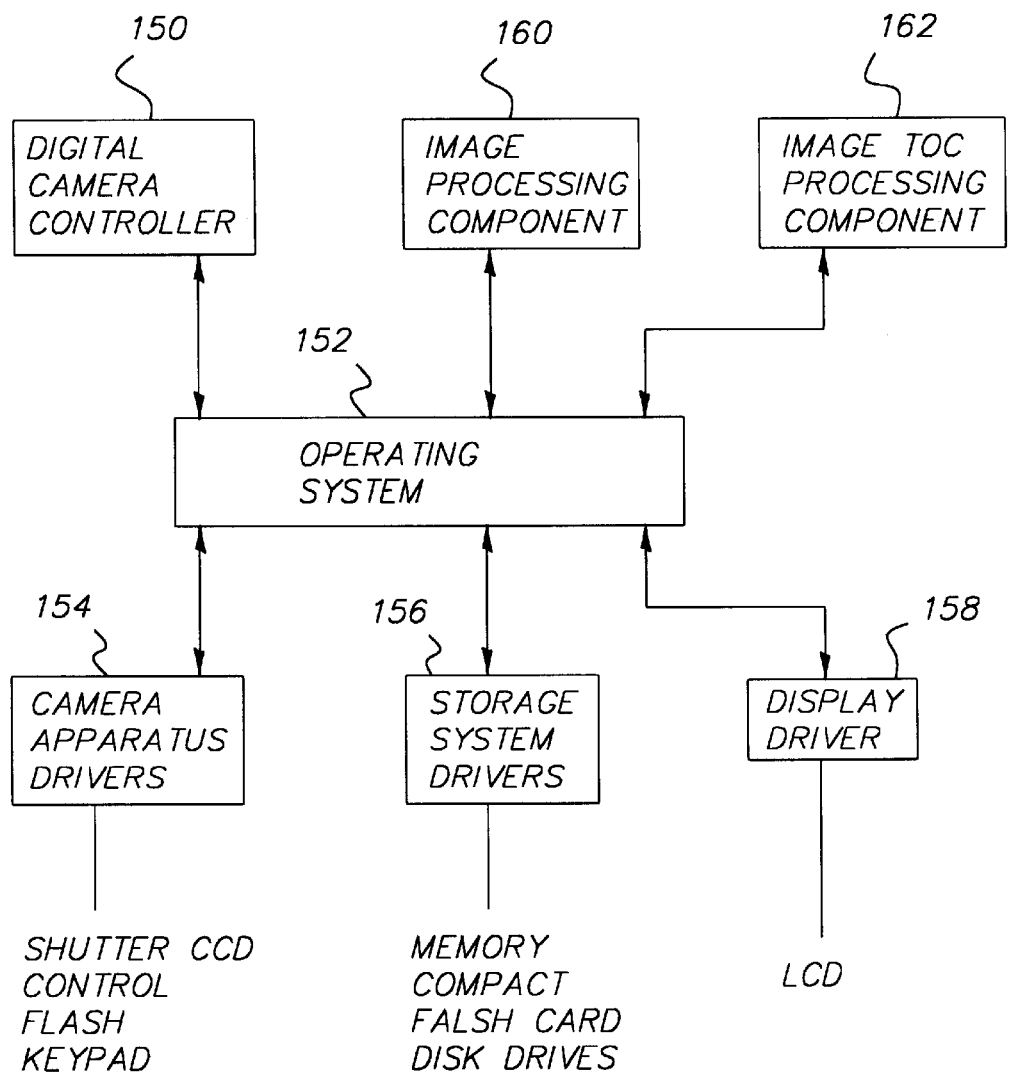
FIG. 7 is a diagram of the firmware components in a digital camera for generating and utilizing the Image Table of Contents file.

FIG. 7 shows the firmware components of a digital camera, specifically for the purpose of implementing the Image TOC feature. A digital camera controller 150 interfaces via an operating system 152 with camera apparatus drivers 154, storage system drivers 156 and a display driver 158 in order to provide control of the elements and components of the camera. An image processing component 160 provides the algorithms and other functionality for manipulating image content. In particular, the operating system component 152 is capable of mounting the filesystem supported by the camera. An Image TOC processing component 162 is responsible for the Image TOC feature. More specifically, the Image TOC processing component 162 builds the presentation display of the files accessed by the storage system drivers 156 and displayed by the display driver 158. Initial recording of the Image TOC, e.g., the presentation names, may require entry of user-specific data through an appropriate device on the camera, such as a small keypad. The digital camera may have the capability to display both the filesystem view of the storage medium provided by the operating system component 152 and the presentation view of the storage device as described by the Image TOC and provided by the Image TOC processing component 162. While these firmware components are shown in a digital camera in FIG. 7, it should be understood that certain of these components may also be implemented in a separate, stand-alone computer. For example, the digital camera may be linked to, or usable with, a computer which includes the image TOC processing component 162, or functionality corresponding thereto, and accordingly provides the capability of building the presentation display of the files. In that case, input devices such as the keyboard 109 (FIG. 5) may be used to input the presentation name and other user-specified data.

The Structure of the Image Table of Contents

A. Table Entries (Fields) that Enable a Common View of the Storage Unit's Contents.

The Image TOC should contain information that enables a common presentation of the removable store's contents by the receiving system regardless of filesystem on-disk structures and naming conventions recorded on the store.

Referring to FIG. 4, the Image TOC should contain a record (the Image TOC entry 40) for each object (file) stored on the removable media. When a device can use multiple units of removable media, the device will have to logically merge each Image TOC on the media units into one table in the device's memory.

One of the fields of an object record would be the actual pathname 44 of the object on the media. This pathname would be in the name space of the mounted filesystem. Since the receiving system has mounted the filesystem and the namespace is described by the filesystem the receiving system will be able to parse this path without further descriptive information in the Image TOC.

The Image TOC will need to contain several fields to support a common presentation by the user interface of the receiving system. There must be one or more fields 46 describing the character set to be used in the user interface presentation. These fields can be similar to the character set describing information used by ISO 13346.

A field in the Image TOC must also provide the pathname 42 of the object as it is to be presented by the graphical user interface of the receiving system. Consequently, there must be fields that describe the syntax of the display path as the user and the receiving system will perform operations based on an interpretation of path components. The directory structure displayed in the presentation may not be the same as that described by the filesystem. In general the user will operate with respect to the displayed view, which may or may not have a corresponding operation that involves the filesystem. In support of this, the separator characters 48 need to be identified and need to be included in the Image TOC so that filesystem like operations can be emulated. There should be fields defining the following separator characters:

1. <SEPARATOR_1>: The character that follows the first component in the path when the first path component is the logical volume name.
2. <SEPARATOR_2>: The character that represents folders of directors. (A "\" or a "/" is usually used for this.)
3. <SEPARATOR_3>: This is an optional separator that is used when a given object, which is the last component of a path, has associated objects. (Not to be confused with named streams.) Therefore an associated object would have a pathname as follows:
   [Logical Volume Name]<SEPARATOR_1>[Root Directory Name]<SEPARATOR_2>[Subdirectory Name]<SEPARATOR_2>[Object Name]<SEPARATOR_3>[Associated Object Name].

When the Image TOC identifies the character set and the separator characters the receiving system's filesystem operations may effectively manipulate the presentation path. How presentation path modifications map to filesystem operations could be vendor dependent or defined within an Image Table of Contents standard.

B. Table Entries (Fields) that Provide Features.

From the discussion on PIMA 15740 it is obvious that the Image TOC may contain fields that support the ObjectInfo Dataset.

The Image TOC may also contain fields that support things like an access control list and time stamps to more completely emulate the virtual filesystem presented by the user interface of the receiving system.

In summary, the inclusion of a standardized Image Table of Contents file on removable storage will enable the presentation of a consistent user interface on a receiving system even when the removable storage media has been recorded with varying filesystems and naming conventions. This can be true when the media is accessed while inserted in a digital camera via a protocol like PIMA 15740 and also when the media is accessed as a mass storage device via an application capable of processing the Image TOC file. Additionally, the Image TOC could provide for a more efficient means to manage PIMA 15740 ObjectInfo Datasets by persistently associating the datasets with the objects on the removable media and saving device internal memory.

The invention has been described with reference to a preferred embodiment. However, it will be appreciated that variations and modifications can be effected by a person of ordinary skill in the art without departing from the scope of the invention.

PARTS LIST

| | |
|---|---|
| 10 | insert media step |
| 12 | mount file system step |
| 14 | read contents of storage device step |
| 16 | display step |
| 20 | read Image TOC step |
| 22 | step of reading contents of storage device aliased by Image TOC |
| 24 | step of displaying contents of storage device aliased by Image TOC |
| 30 | root directory |
| 32 | picture directory |
| 32abc | pictures |
| 34 | picture directory |
| 34abc | pictures |
| 36 | audio record |
| 38 | Image TOC file |

PARTS LIST -continued

| | |
|---|---|
| 40 | Image TOC entry |
| 42 | presentation pathname |
| 44 | storage unit's filesystem pathname |
| 46 | presentation character set |
| 48 | separator character set |
| 100 | CPU |
| 101 | system bus |
| 102 | RAM |
| 103 | ROM |
| 104 | I/O adapter |
| 105 | disk unit |
| 106 | tape drive |
| 107 | communication adapter |
| 108 | user interface adapter |
| 109 | keyboard |
| 110 | mouse |
| 111 | scanner |
| 112 | printer |
| 113 | display adapter |
| 114 | display device |
| 120 | capture section |
| 121 | optical section |
| 122 | image sensor |
| 123 | exposure control mechanism |
| 124 | flash unit |
| 130 | removable digital storage device |
| 132 | display device |
| 140 | shutter button |
| 141 | flash controls |
| 142 | programmed exposure selections |
| 150 | digital camera controller |
| 152 | operating system |
| 154 | camera apparatus drivers |
| 156 | storage system drivers |
| 158 | display drivers |
| 160 | image processing component |
| 162 | Image TOC processing component |

What is claimed is:

1. In a computer system having a processor running an operating system that supports one or more filesystems and a removable storage device capable of storing therein images captured by a digital camera and formatted by the operating system according to a supported filesystem, a method comprising the computer-implemented steps of:

(a) storing in the removable storage device a first directory entry for a filesystem wherein the first directory entry includes a file name having a restrictive pathname imposed by the naming convention of the supported filesystem;

(b) storing in the removable storage device an image table of contents for the stored images wherein the image table of contents includes a presentation filename having a presentation pathname selected by a user of the digital camera, said presentation pathname being independent of the naming convention of the supported filesystem; and (c) storing in the image table of contents a linkage between the image table of contents and the first directory such that the presentation pathname may be mapped into the restrictive pathname whenever the first directory is accessed for presentation by a user interface, whereby the image table of contents provides a record structure that provides for an association of the presentation pathname and the restrictive pathname.

2. The method as claimed in claim 1 wherein in step (c) the presentation pathname is displayed by the user interface in place of the restrictive pathname regardless of the supported filesystem.

3. The method as claimed in claim 1 wherein the processor is in a digital camera and the computer-implemented steps are run in the camera.

4. The method as claimed in claim 1 wherein the processor is in a host computer and at least one of the computer-implemented steps are run in the host computer.

5. The method as claimed in claim 1 wherein the image table of contents contains a linkage between the image table of contents and each image stored in the first directory such that the presentation pathname for each image may be mapped into the restrictive pathname whenever the first directory is accessed for presentation by a user interface.

6. The method as claimed in claim 1 further comprising the step (d) of storing a character set to be used in the presentation by the user interface.

7. The method as claimed in claim 1 wherein the presentation pathname constitutes an alias name for each image, and the presentation pathname is aliased into the restrictive pathname.

8. An image table of contents format in a removable storage device intended for the storage of images, said format comprising:
   a first entry for the image table of contents including a file name having a restrictive pathname imposed by the naming convention of a supported filesystem;
   a second entry for the image table of contents including a presentation filename having a presentation pathname specifically selected for one of the images, said presentation pathname being independent of the naming convention of the supported filesystem,
   whereby the second entry is linked to the first entry such that the presentation pathname may be mapped into the restrictive pathname whenever the first entry is accessed for presentation by a user interface of a receiving system.

9. The format as claimed in claim 8 wherein the image table of contents format further includes an entry for a character set to be used in the presentation by the user interface of the receiving system.

10. The format as claimed in claim 8 wherein the image table of contents format further includes an entry for separator characters to provide the pathname of an object as it is to be displayed by the presentation of the second entry through the user interface of the receiving system.

11. The format as claimed in claim 8 wherein the image table of contents format further includes an entry for containing a dataset of features that more completely emulate the filesystem presented by the user interface of the receiving system.

12. The format as claimed in claim 8 and incorporated in a processing component in a digital camera.

13. The format as claimed in claim 8 and incorporated in a processing component in a computer.

14. A method for managing a removable storage device used in a digital camera with one or more supported filesystems, comprising the steps of:
   (a) inserting the removable storage device into the digital camera;
   (b) mounting one of the supported filesystems, thereby creating a mounted filesystem;
   (c) in response to the removable storage device being inserted into the digital camera, automatically creating a filesystem pathname in the storage device having syntax imposed by a naming convention of the mounted filesystem; and
   (d) in response to user input, creating an image table of contents in the storage device, said image table of contents including a presentation pathname specifically selected for each of the images, said presentation pathname being independent of the naming convention of the mounted filesystem.

15. The method as claimed in claim 14 in which the method is supported in the digital camera.

16. The method as claimed in claim 14 in which the method is supported at least in part in a computer usable with the digital camera.

17. A method for managing a removable storage device containing image contents captured by a digital camera and accessed in accordance with one of a plurality of supported filesystems, comprising the steps of:
   (a) inserting the removable storage device into the digital camera;
   (b) mounting one of the supported filesystems, thereby creating a mounted filesystem having a filesystem pathname imposed by a naming convention of the mounted filesystem;
   (c) accessing an image table of contents in the storage device, said image table of contents including a presentation pathname specifically selected for each of the images, said presentation pathname being independent of the naming convention of the mounted filesystem;
   (e) reading the image contents of the removable storage device as aliased by the presentation pathname of the image table of contents; and
   (f) displaying the image contents of the removable storage device as aliased by the presentation pathname of the image table of contents.

18. The method as claimed in claim 17 in which the method is supported in the digital camera.

19. The method as claimed in claim 17 in which the method is supported at least in part in a computer usable with the digital camera.

20. A system for managing a removable storage device containing image contents captured by a digital camera and accessed in accordance with one of a plurality of supported filesystems, said camera system comprising:
   a removable storage device that is adapted for insertion into the digital camera via a storage interface;
   an operating system for mounting one of the supported filesystems, thereby creating a mounted filesystem having a filesystem pathname imposed by a naming convention of the mounted filesystem;
   a processor for (a) accessing an image table of contents in the storage device, said image table of contents including a presentation pathname specifically selected for each of the images, said presentation pathname being independent of the naming convention of the mounted filesystem and (b) reading the image contents of the removable storage device as aliased by the presentation pathname of the image table of contents; and
   a user interface stage for displaying the image contents of the removable storage device as aliased by the presentation pathname of the image table of contents.

21. The system as claimed in claim 20 in which the system is incorporated in a digital camera.

22. The system as claimed in claim 20 in which the system is incorporated at least in part in a computer.

23. The system as claimed in claim 20 wherein the presentation pathname is displayed by the user interface in place of the filesystem pathname regardless of the supported filesystem.

* * * * *